US008823658B2

(12) United States Patent
Zdralek (10) Patent No.: US 8,823,658 B2
(45) Date of Patent: Sep. 2, 2014

(54) BIMANUAL GESTURE BASED INPUT AND DEVICE CONTROL SYSTEM

(76) Inventor: James Franklin Zdralek, Ottawa (CA)

(*) Notice: Subject to any disclaimer, the term of this patent is extended or adjusted under 35 U.S.C. 154(b) by 574 days.

(21) Appl. No.: 13/063,536

(22) PCT Filed: Sep. 11, 2009

(86) PCT No.: PCT/CA2009/001242
§ 371 (c)(1),
(2), (4) Date: Mar. 11, 2011

(87) PCT Pub. No.: WO2010/028484
PCT Pub. Date: Mar. 18, 2010

(65) Prior Publication Data
US 2011/0163956 A1     Jul. 7, 2011

(30) Foreign Application Priority Data
Sep. 12, 2008  (CA) .................................. 2639611

(51) Int. Cl.
*G06F 3/041*     (2006.01)
(52) U.S. Cl.
USPC .......................................... 345/173; 345/156

(58) Field of Classification Search
USPC .................................................. 345/175–178
See application file for complete search history.

(56) References Cited

U.S. PATENT DOCUMENTS

| 6,396,523 | B1 | 5/2002 | Segal et al. | |
| 7,372,993 | B2 | 5/2008 | Lagardere et al. | |
| 2006/0010400 | A1* | 1/2006 | Dehlin et al. | 715/856 |
| 2009/0300554 | A1* | 12/2009 | Kallinen | 715/863 |

FOREIGN PATENT DOCUMENTS

| WO | 2008030976 | A2 | 3/2004 |
| WO | 2006096501 | A1 | 9/2006 |
| WO | 2007089766 | A2 | 8/2007 |

* cited by examiner

*Primary Examiner* — Robin Mishler
(74) *Attorney, Agent, or Firm* — Mervyn J. Valadares (57) ABSTRACT

A user conveys information to a receiving device with a data input tool which uses combinatorial gesture patterns from the cursor or track point of two single point devices. The input method is independent from hardware and language limitations, improves the user's ability to focus on the data stream being entered and reduces the footprint of the data input tool.

23 Claims, 6 Drawing Sheets

BIMANUAL GESTURE BASED INPUT AND DEVICE CONTROL SYSTEM

FIELD OF THE INVENTION

The present invention relates to a method for text and command input to an electronic device.

BACKGROUND OF THE INVENTION

Text input is largely dominated by legacy technology. For instance, the classic typewriter keyboard layout with Latin characters, known as the QWERTY keyboard, was developed around physical restrictions of the mechanical typewriters. Among other restrictions, the splitting up of key positions for letters commonly used together was dictated by the tendency of entanglement between neighbor type bars when the typing speed increased. Although modern electronic devices no longer use type bars, the QWERTY layout became standard and is used to this day in spite of many limitations. The language aspect turns physical keyboards into specialist technology tools, which assume different shapes and sizes according to specific language requirements.

In the past the data input focus has been on speed, where touch typists have shown great skill in transcribing very fast. More recently, there has been a shift of focus, with the trend towards device miniaturization, promoting size as a major constraint.

The most common device for data input is the keyboard, which features several inconveniences. Keyboards contain a considerable number of component parts that add to the manufacturing cost. Keyboards are typically language specific; therefore a desktop computer used for multilingual purposes—with dramatically different character sets—would require more than one keyboard to operate properly. Manufacturing any technology with an embedded keyboard would render that device language specific. Furthermore, keyboards are manufactured in an average size that is rarely ideal. The size of a typical keyboard can pose problems for users with hands either larger or smaller than average.

The consideration of physical disabilities highlights further inconveniences of keyboards. Missing or damaged limbs and appendages make keyboard use difficult. Physical injury, such as tissue or tendon damage, can arise from improper typing technique. Furthermore, keyboards feature a "learning dissuasion" aspect. A keyboard with letters engraved on the keys dissuades users from learning to touch type, that is, type without looking at the keyboard itself. These keyboards encourage users to look away from the device display, such as a monitor, and concentrate on the text input device itself. This can increase operator error.

Prior art attempts have been made to circumvent the limitations of the traditional devices for inputting text and commands. For example, U.S. Patent Publication No. 2008/0036743 in the name of Apple Computer, Inc. filed on Jan. 31, 2007 discloses methods and systems related to gesturing with multi-point sensing devices. One of this system's inconveniences is the dependency on multi-point devices capable of reading multiple inputs simultaneously. Compared to single point input devices, these are costly and complex. They are also more sensitive to imperfections in the user's input technique, requiring proper recognition of "chords" and patterns in order to convey the desired information to the receiving device. Moreover, multi-point devices require full inventory and control of all fingers, imposing a steep learning curve on the user. The difficulty of displaying all gestures in an easily browseable form requires solid memorization skills, which many users might not possess.

SUMMARY OF THE INVENTION

The present invention is directed towards a method for text and command input to an electronic device combining the movement of the two single point devices into a bimanual gesture.

In one aspect, the method comprises the independent movement of two single point devices by the user, each providing a single point input signal. Examples of single point devices can be a mouse, a touch pad, a track pad, a palm pad, a touch screen or a touch sensitive housing.

Data introduced with the aid of the single point devices is passed to an Arbitrator that determines where the input should be transferred. The system state can be selected from either "Pointing" or "Texting". The input signal is submitted to a Basic Gesture Normalizer that processes the single point inputs individually and applies filters to the data. A Contextual Gesture Normalizer performs additional filtering and the data is forwarded to a Gesture Interpreter. This Gesture Interpreter uses key maps to convert the contextually processed gestures to a specific command or character, which is then passed on to a Gesture Commander and ultimately relayed to the electronic device's Operating System.

A help display is triggered whenever the system detects hesitation on the part of the user upon conducting a gesture.

Another object of the present invention is to provide a hardware-independent way of entering text and commands into an electronic device that can switch languages easily and is accessible to people with a limited range of motion.

Another object of the present invention is to provide a compact-sized text and command input interface which can accommodate small electronic devices without compromising user comfort, data input performance or accuracy.

Another object of the present invention is to provide ready and intuitive access to multiple menu functions, reducing focus errors by ensuring users are looking at the display screen rather than at the input device.

Another object of the present invention is to provide a text and command input interface that can be used in non-traditional computing environments, including extreme temperature, dirt, etc.

Another object of the present invention is to eliminate the requirement for the user to be familiar with traditional typing and keyboard layout.

Another object of the present invention is to reduce the part count and complexity of laptops and other devices with embedded keyboards or keypads.

Another object of the present invention is to make rare languages more easily accessible to the market by reducing the cost barrier of a language specific piece of hardware to that of an easily modified software update.

Another object of the present invention is to eliminate homing errors by adjusting the home position to the neutral position of the user. The elimination of homing issues is beneficial to blind or visually impaired users who have to feel for the home position on a traditional keyboard.

On touch screen input devices the lack of tactile feedback to guide the user makes finding the home position problematic. The elimination of homing errors aimed by one aspect of the present invention thus benefits users of touch screen applications, where no physical keys give an indication of where the home position is.

Another object of the present invention is to improve learning retention through a "behavioral trap learning" process by encouraging the user to guess before activating the help display.

Another object of the present invention is to improve learning retention of the user through the use of a positional mnemonic.

Another object of the present invention is to improve the portability of the users learned gestures by using any hardware for input.

Another object of the present invention is to minimize the mechanical impact inherent to key based text and command entry.

Another object of the present invention is to improve the accessibility of text entry by calibrating the detection of gestures to the available range of motion of the user.

Another object of the present invention is to improve the usability of text entry on small devices by replacing the targeted, shrunken keyboard keys with more easily reproduced shrunken gestures that do not require targeting.

Another object of the present invention is to improve the usability of text and command entry devices in harsh environments where the use of protective gear makes targeting of keyboard keys very difficult.

The above objects as well as additional features and advantages of the present invention will become apparent in the following description and figures.

BRIEF DESCRIPTION OF THE DRAWINGS

A more complete understanding of the present invention may be had by reference to the following detailed description when taken in conjunction with the accompanying drawings, wherein.

Where used in the various figures of the drawing, the same numerals designate the same or similar parts.

DETAILED DESCRIPTION

The invention will now be described with reference to the figures. The figures are intended to be illustrative rather than limiting and are included herewith to facilitate the explanation of the invention.

According to the present invention, text and command data is input to a receiving device for processing. As used herein, the term "receiving device" designates an information processing device. Examples of receiving devices include, but are not limited to, a PDA, a telephone, a music player, a vehicle, a portable computer, a personal computer, a television or any other information processing device.

According to the present invention, text and command data are input to the receiving device by means of two single point input devices. As used herein, the term "single point input device" designates a source of digital data signal which is generated by any tool physically controlled by any appendage that allows for reasonably synchronized and coordinated mimicry of bimanual skill or a single touch screen or touch pad device used to detect two points of input. Examples of tools include, but are not limited to, a mouse, a touch pad, a track pad, a palm pad, a touch screen and a touch sensitive housing, which the user employs to control each of the two single point input devices. As used herein, the term "input device cursor or track point" designates the element of the device which movement is considered for the purposes of the present invention.

As used herein, the term "bimanual", typically means with the use of two different parts of the human body, including but not limited to appendages such as the fingers, thumbs, hands, arms, legs, feet, toes, tongue or a combination of the above body parts. As such, users who do not possess the dexterity or capability to use one or more fingers, thumbs, hands, etc, may still use the present invention by using an alternate combination of two appendages with which they are dexterous.

According to the present invention, the user communicates the desired text or command information to the receiving device by moving single point input devices, as a gesture. As used herein, the term "gesture" designates the bi-dimensional movement the user performs with the input device cursor or track point. The successive positions occupied by the input device cursor or track point upon performing the gesture originate the device's track. As used herein, the term "single point input device track" designates the line corresponding to the positions occupied by the input device cursor or track point upon performing said gesture.

Figure 2:
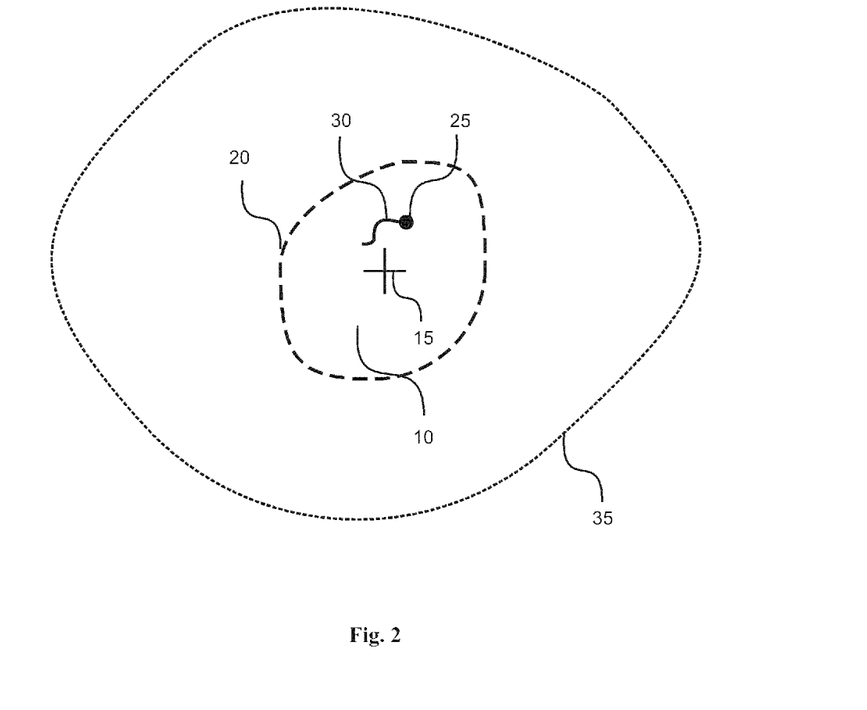
FIG. 2 illustrates a typical situation in which the input device cursor or track point is dwelling inside the boundaries of the neutral home position.

According to the present invention, the spatial reference used to detect and track the gestures is the neutral home position, which is established by a boundary line. As used herein, the term "neutral home position" designates a bi-dimensional area inside which the single point input device cursor or track point is deemed to be home, and the term "boundary line" designates the limits of this area. Referring to FIG. 2, the neutral home position 10 is shown relative to an exact center position 15 and a boundary line 20. Also shown in FIG. 2 is a single point input device cursor or track point 25, a cursor track 30, and a typical range boundary line 35. The terms "range", "direction" and "orientation" of the gesture are to be understood with their standard meanings. The range of the gesture is relevant to the point of ascertaining whether the device cursor or track point actually crossed the boundary line 20 or not.

The neutral home position boundary line 20 may be continuously updated and modified as the user's gesture speed, neutral home position, gesture sequence and other behaviours change.

Figure 3:
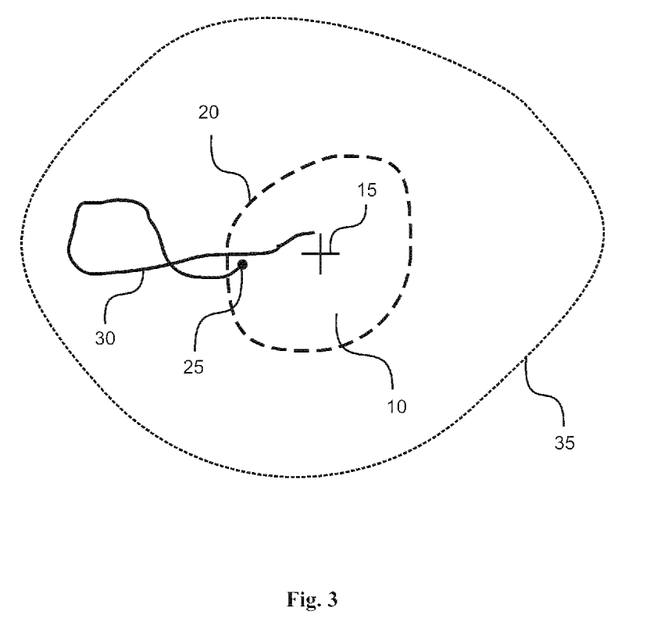
FIG. 3 illustrates a typical situation in which the user has performed a gesture.
Figure 4:
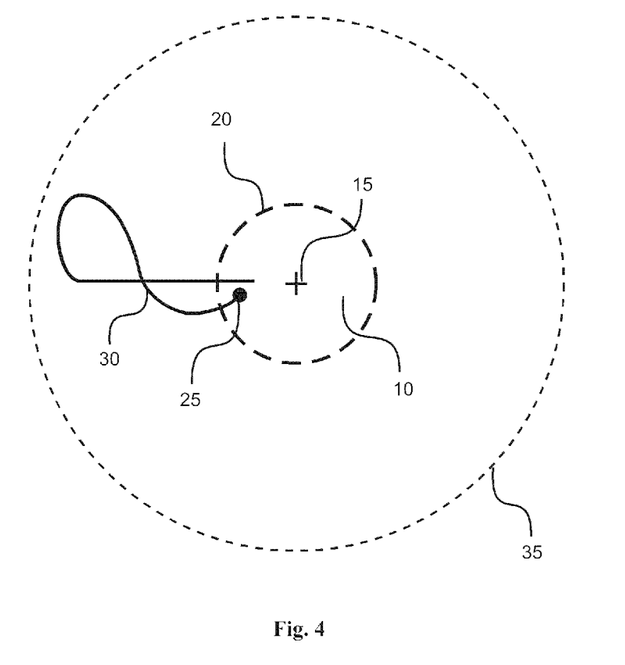
FIG. 4 illustrates a situation in which the user has performed a round trip gesture.

As used herein, the term "round trip gesture" designates a gesture in which the single point input device cursor or track point 25 departs from the neutral home position 10, crosses the boundary line 20 in its outbound movement, then crosses the boundary line 20 again in its inbound movement back to the neutral home position 10, as illustrated in FIGS. 3 and 4. The system detects an "interruption of the gesture" based on the amount of time the single point input device cursor or track point 25 dwells outside the boundary line 20.

The present invention relates to methods and systems for implementing gestures using two independent single point inputs. The method can be used to provide input in the form of text, symbols, commands and mode changes for an electronic device, such as a computer. The method can be used to select characters from any language, for example from the Latin, Arabic, Chinese or Japanese character sets. Little known or ancient language scripts can also be used with the method of the present invention.

The present invention operates in at least two selectable modes. A first mode provides input using a method of combinatorial dual point gesturing from both single point inputs. A second mode provides input from the secondary single point input using single point gesturing while the primary single point input is used in a manner customary with the operating system on which this system and method is implemented. Other modes are contemplated.

According to the present invention, each of the gestures performed by a single point input device cursor or track point 25 comprises a departure from the home position 10 of the single point input device cursor or track point 25 in one of the eight cardinal and intercardinal directions with a completion of the gesture by returning to the home position 10 in one of three ways comprising a linear return, a counterclockwise return or a clockwise return. These eight departures and three returns combine to form twenty-four dynamic gestures that return the single point input device cursor or track point 25 to the home position 10. When the gestures are simultaneously actuated with two single point inputs, five hundred seventy-six combinatorial gestures are possible. Of this set of gestures, the simplest to perform are assigned to the most common actions, such as those corresponding to the more frequently used characters of a given script, or the more frequently used commands for the user in a given environment. The system can be configured to load different mappings of character and command to each gesture to allow for group specific improvements in efficiency.

Figure 5:
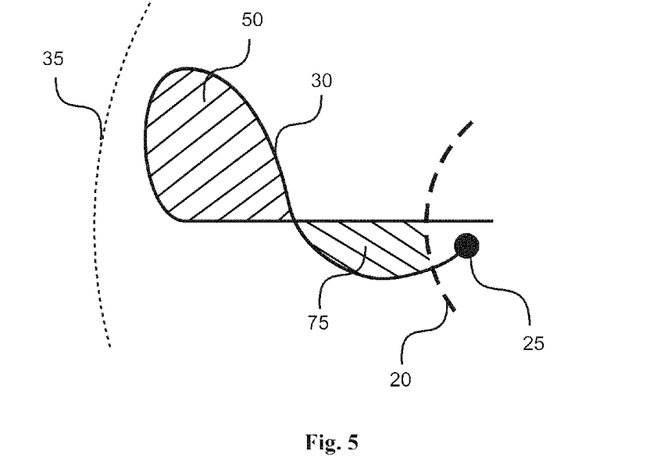
FIG. 5 illustrates in closer detail an exemplary use of the areas delimited by the crossing of the outbound and inbound movement tracks for determining the direction of a return gesture.
Figure 6:
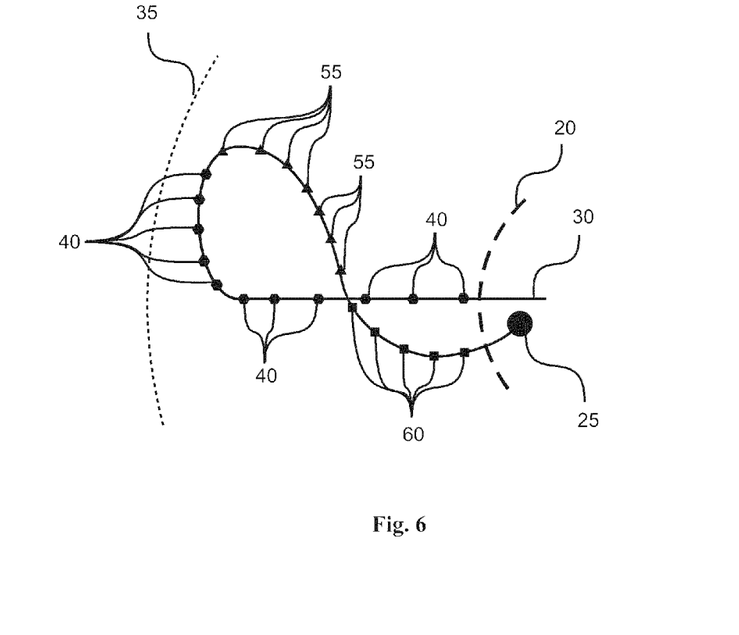
FIG. 6 illustrates in closer detail an exemplary use of intermittent track points for determining the direction of a return gesture.
Figure 7:
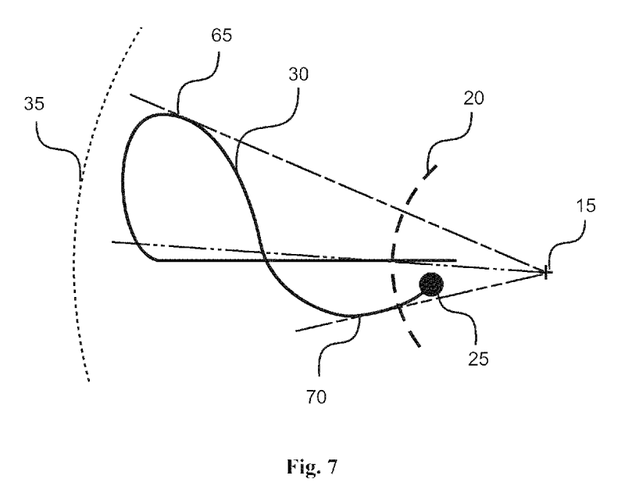
FIG. 7 illustrates in closer detail an exemplary use of maximum angles for determining the direction of a return gesture.
Figure 8:
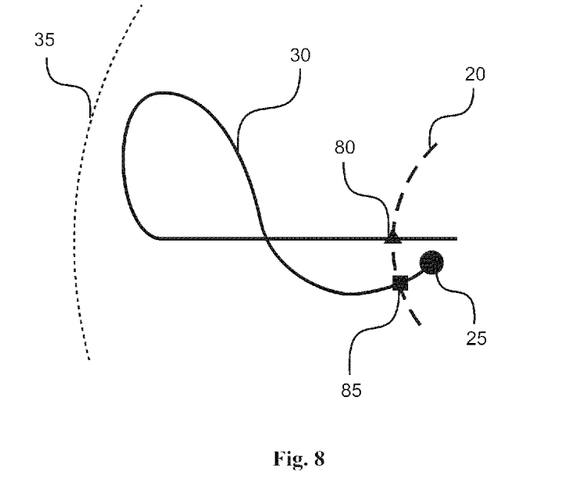
FIG. 8 illustrates in closer detail an exemplary use of boundary crossing for determining the direction of a return gesture.

Even though the present invention requires interpretation of the input device's cursor or track point movements to operate consistently and reliably, the track 30 taken by a single point input device cursor or track point 25 as the user moves the device might not always be consistent. The system considers the possibility that erroneous consideration of the track could ultimately result in the input of a character that is different from the one originally intended by the user. There are four alternative measuring methods that may be used by the invention to establish whether the completion of a given gesture configures a linear, clockwise or counter-clockwise return to the home position:

a) Eventual crossings of the outbound track along the inbound movement establish one or more bounded areas. The areas are calculated, with those laid to one side of the outbound track being assigned a positive signal 50 while those laid to the opposite side being assigned a negative signal 75. The net sum of the areas indicate whether the return track should be considered linear, clockwise or counter-clockwise (see FIG. 5);

b) The system registers the tracks as a series of points. Referring to FIG. 6, outbound track points 40, positive inbound track points 55, and negative inbound track points 60 are shown. Analyzing the inbound portion of the track, the number of inbound track points to one side or the other of the outbound track are balanced, again with opposite signs. The net sum of the positive and negative inbound points will indicate whether the return track should be considered linear, clockwise or counter-clockwise;

c) The system can identify the two extreme points 65 and 70 made by single point input device cursor or track point 25 for either side along the outbound and inbound tracks. The angles formed by straight lines traced from the origin point 15 to the outer points can be calculated, again with opposite signs. The net sum of the extreme angles indicate whether the return track should be considered linear, clockwise or counter-clockwise (see FIG. 7);

d) Both the outbound and inbound portions of the track cross the boundary line of the neutral home position 20 for any complete gesture. The position of the outbound crossing point 80 and inbound crossing point 85 in relation to each other indicate whether the return track should be considered linear, clockwise or counter-clockwise, as shown in FIG. 8.

The combination of the values and their weight in the calculation are part of the profiling effort that will be described further below.

Figure 1:
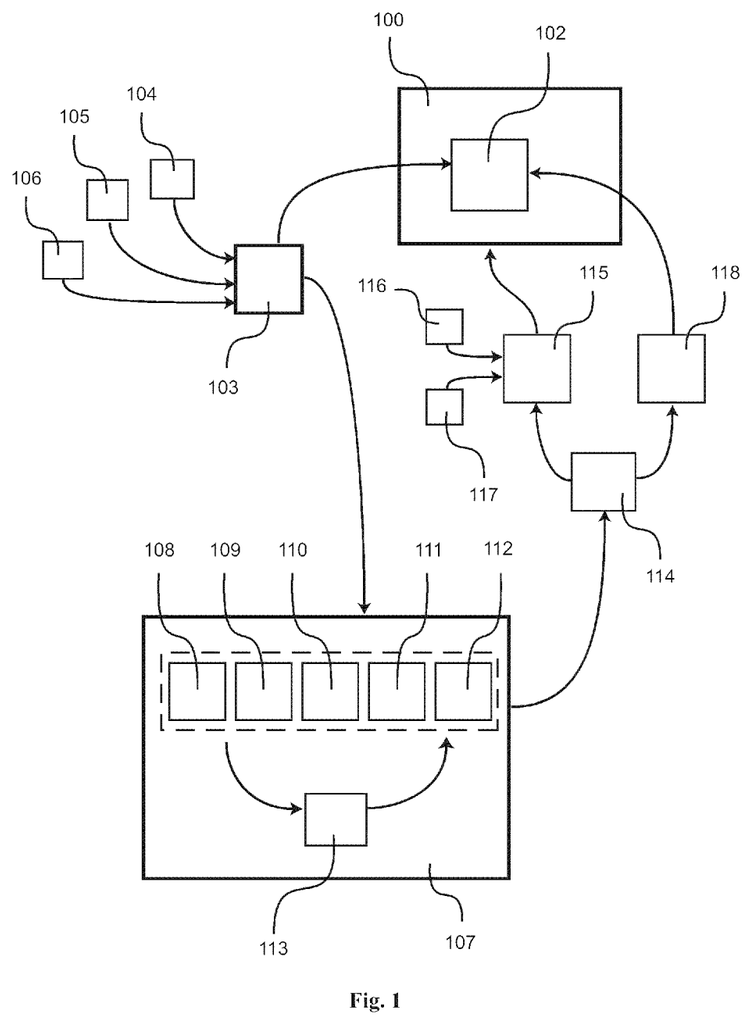
FIG. 1 is a diagram depicting the data processing according to one aspect of the present invention.

Referring to FIG. 1, an embodiment of the present invention comprises an Information System 100 which is the final destination of the processed information. The Information System 100 runs on a given Operating System 102. The invention also comprises an Arbitrator 103 that determines where the input signals should be transferred to, and a set of single point inputs. The single point inputs are classified as a single Primary Input 104; a single Secondary Input 105 and any number of Tertiary Inputs 106. Tertiary Inputs 106 bypass the Arbitrator 103 and proceed directly to the Operating System 102 without any modification.

A Basic Gesture Normalizer 107 processes the signals received from the single point inputs 104, 105 individually and applies several filters before relaying the signals for further processing. These filters account for device-inherent differences, individual device differences, user group differences and individual user differences. The filters aggregated under the Basic Gesture Normalizer 107 are described as follows:

Device Standard Profiler 108: profiles the type of single point input device used to enter the gesture and filters out any effect that may be attributed to the device, such as blanking out at the edges for a track pad when the user's finger movement leads the track off the edge.

Individual Device Profiler 109: profiles the specific single point input device used to enter the gesture and filters out any effect that may be attributed to that specific, individual device such as a tendency to wander in one direction or a jitter.

User Group Profiler 110: profiles the general type of user and filters out any effect that may be attributed to a group pattern, such as advanced or beginner user patterns.

Individual User Profiler 111: profiles that individual user, if the user has approved such profiling, and filters out any effect that may be attributed to a specific person, such as a larger range of motion towards one side when compared to the same motion when performed towards the opposite side.

A Contextual Gesture Normalizer 112 comprises filters that account for key map differences, back casting and anticipation using language patterns. It also features filters that account for timing differences and paired differences.

Key map differences are used to detect whether the most likely interpreted gesture has a neighboring empty slot which would characterize a blank gesture, and filters the interpretation of the gesture to weight the gestures that are non-blank as more probable.

Back casting detects whether the previous gesture has had an effect on the current gesture and filters this effect out.

Anticipation using Language Key Differences looks at what language is loaded, for example English, Urdu, Mandarin, etc., and determines what pattern of characters typically follow each other. It then uses the most probable following gesture and detects whether the following gesture is having an effect on the current gesture through anticipation, in which case it filters this effect out.

Timing Differences apply only to a pair of inputs—for instance two track pads—and detects whether each input is being created synchronously or if one is being completed before the other, in which case it filters out the delay.

Just like Timing Differences, the use of Paired Differences applies only to a pair of inputs, and detects whether the combination of the two gestures have an effect on each other, in which case it filters this effect out.

A Filter Manager 113 determines which filters are being the most effective or need updating and adjusts. It weights, updates and can switch each individual filter on or off. The values corresponding to the amount of filtering based on the individual user profile are processed into a single value that reflects the gesture maker's match to a specific user profile. This profile match can be passed to the Operating System 102 for login, customization or other enhanced security features.

An additional task performed by the Contextual Gesture Normalizer 112 and Filter Manager 113 is the continuous update and modification of the neutral home position of the single point input device, adapting to eventual behavioral changes in aspects such as the user's gesture speed, choice of neutral position and a gestures positional sequence.

A Gesture Interpreter 114 interprets gestures as a departure from a neutral home position, a return to the neutral home position, a click, a dwell or a rotational browsing gesture. Based on such interpretation, it generates a gesture value that is passed on to a Gesture Commander 115. This Gesture Commander 115 makes use of a conversion table to look up the gesture value on either a Pointing Key Map 116 or a Texting Key Map 117 and generates the corresponding Gesture Command, which is the actual input relayed to the electronic device's Operating System. The choice between the key maps of texting and pointing is ruled by the state in which the system is activated, referred to as "Texting or Pointing". The activation is performed through mode choice, which is performed via specific gestures.

Usually the activation of a different key map is due to a language change, but it can also be an optimization change similar in reasoning to the change from QWERTY to Dvorak standards on a traditional keyboard. Several key maps can be installed at once and switched between using specific gestures. If the Gesture Command results in an instruction to change the state of the system between "Pointing" and "Texting", then this instruction is passed to the Arbitrator 103. If the Gesture Command results in the selection of a different key map, this new key map information is passed to the Filter Manager 113.

The present invention incorporates artificial intelligence features, such as learning from the user's perceived mistakes to improve the system's responsiveness to that particular user. For example, if during character entry the Gesture Command is a backspace, or if during command entry an undo command is detected following a given Gesture Command, this information is used to refine gesture interpretation for corrective behaviors. This information is passed to a Filter Manager 113. Therefore, the system learns which mistakes that a given user tends to make, and optimizes the access to the instruction perceived as correct on future instances of the same mistake. The values corresponding to the amount of filtering corrections are also passed to the Filter Manager 113.

A Display Manager 118 monitors the data flow and occasionally selects information that will be displayed for the user. The Display Manager 118 manages the visual display, accepts displaying instructions and passes the appropriate display commands to the Operating System 102.

The values corresponding to the amount of filtering are processed into a single value that reflects the gestures match strength. This value is passed to the Display Manager 118 and, depending on the user's preferences, may be displayed.

If the Gesture Command results in a command, as opposed to text and symbols, this instruction is passed to the Display Manager 118. Depending on the user's predefined preferences, the selected command can be echoed by visually displaying it in order to disambiguate what gesture was just entered. When the gesture is a command, it may not have a visual effect such as text being entered and displayed, and therefore echoing the command visually can be reassuring for a beginning user.

If the Gesture Command results in an instruction to initiate gesture browsing, or cycle gesture browsing, this instruction is passed to the Display Manager 118. If the Gesture Command results in a character key or command, this instruction is passed to the Operating System 102.

An example of the functioning of the present invention is now presented.

Data introduced with the aid of multiple single point inputs 104, 105, 106 attached to an information system having a receiving device is passed to an Arbitrator 103 that determines where the input should be transferred. The Tertiary Inputs 106 are passed by the Arbitrator 103 and proceed directly to the Operating System 102 without any modification.

If the system state is selected as "Pointing", the Primary Input 104 data is passed by the Arbitrator 103 to the Operating System 102 without modification. The Secondary Input 105 data is passed by the Arbitrator 103 to the Basic Gesture Normalizer 107 without modification.

If the state is "Texting", both the Primary Input 104 data and the Secondary Input 105 data are forwarded by the Arbitrator 103 to the Basic Gesture Normalizer 107 without modification.

The Basic Gesture Normalizer 107 processes the single point inputs individually and applies filters to the data. If the system state is selected as "Pointing", only the raw gesture from the Secondary Input 105 is being passed. If the state is "Texting", the raw gestures of both the Primary Input 104 and the Secondary Input 105 are being passed.

Once the raw gestures of the two single point inputs 104, 105 have been normalized by the Basic Gesture Normalizer 107, the processed gestures are passed along with values corresponding to the amount of filtering to the Contextual Gesture Normalizer 112. If the state is "Pointing", only the processed gesture from the Secondary Input 105 is being passed, with the Contextual Gesture Normalizer 112 applying the proper filters to the data. If the state is "Texting", the Contextual Gesture Normalizer 112 applies filters to the processed gestures of both the Primary Input 104 and Secondary Input 105 to account for timing differences and paired differences in addition to the filters for key map differences, back casting and anticipation using language patterns.

Now further normalized by the Contextual Gesture Normalizer 112, the contextually processed gestures are passed along with values corresponding to the amount of filtering to the Gesture Interpreter 114. If the state is "Pointing", only the contextually processed Secondary Input 105 data is passed and so the Gesture Interpreter 114 uses the "Pointing Key Map". If the state is "Texting", the Gesture Interpreter 114 uses the "Texting Key Map" to match both the Primary Input 104 and Secondary Input 105 contextually processed gestures to the command or character.

The Gesture Interpreter 114 then generates a gesture value that is passed to the Gesture Commander 115, which matches the gesture value with a Gesture Command loaded from the active "Key Map", which depending on the mode activated can be a Pointing Key Map 116 or a Texting Key Map 117. The resulting instruction is finally passed to the Operating System 102 of the Information System 100.

A single input gesture can be made in either texting or pointing mode. Only single input gestures can be made in pointing mode. Both single input gestures and full gestures can be made in texting mode.

If the single point input device cursor or track point dwells outside the boundary line longer than a predefined amount of time, the system interprets this event as an interruption of the gesture and triggers the display of a visual or other indicator, such as a help screen. The information pertaining to the help mechanism can be presented on the same graphic interface display that the user normally monitors during regular operation of the electronic device, thus preserving the user's focus on the graphic interface display. The present invention selects the content of the help screen based on particular aspects of the gesture interruption such as range, direction and orientation of the interrupted gesture, and such customization ensures the relevance of the information displayed for the user at that particular moment.

The invention's gesture pattern system uses the detection of departure with a dwell outside of the neutral home position to trigger the display of a command and character pallet that can be browsed by circling the neutral home position. Therefore, by circling the neutral home position with the single point input device cursor or track point the user browses through and displays all the various commands and characters in a manner that is practical, fast and intuitive. Additionally, it helps the user's mnemonic memorization of the corresponding gesture.

The method of the present invention improves learning retention through a "behavioral trap learning" process by encouraging the user to guess before activating the help display. To activate the display of the gesture pallet the user partially completes a gesture by leaving and dwelling beyond the neutral home position. The direction of the input device's cursor or track point track upon leaving the neutral home position constitutes the guess and the behavioral trap that encourages learning.

As can be understood from the description, the present invention provides numerous advantages over the prior art.

The invention eliminates the language restrictions associated with traditional keyboards and other data input devices by eliminating the need of language-specific input hardware. It can be used in non-traditional environments (extreme temperature, dirt, etc) where the use of protective gear compromises the targeting of standard keyboard keys and similar devices. It allows quick input of characters in languages with large character sets. It does not require the user to know traditional typing and keyboard layout. It eliminates homing errors by adjusting the home position to the neutral position of the user. It eliminates homing delays by not requiring touch-typing users to feel the keys for the home position. It helps blind or visually impaired users and users of touch screen applications by removing the need for tactile feedback of the home position location. It reduces the part count of traditional laptops, PDAs and other devices with embedded keyboards or keypads. It reduces focus errors by ensuring users are looking at the display screen rather than at the input device. It improves learning retention through a "behavioral trap learning" process by encouraging the user to guess before activating the help display. To activate the display of the gesture pallet the user partially completes a gesture by leaving and dwelling beyond the neutral home position. The direction the user moves the single point input device cursor or track point upon leaving the neutral home position naturally corresponds to the user's guess, which the user verifies once the gesture pallet is displayed. Thus the standard routine for consulting the gesture pallet incorporates the guessing of the correct movement, setting a behavioral trap that encourages learning. It improves learning retention through positional mnemonics by having the user browse the gesture pallet by circling home. By the time the user discovers the character that was being searched, he or she is already in the correct position to complete the gesture.

Furthermore, the invention improves the portability of the users learned gestures by using any hardware for input. This allows a user who has learned the gestures using, for example, the hands on two optical mice on a desktop computer, to input text on a laptop with two touch pads or even a PDA or phone which could detect the gestures made by, for example, two thumbs.

The invention minimizes the mechanical impact of key based text and command entry. The invention improves the accessibility of text entry by calibrating the detection of gestures to the available range of motion of the user, and also improves the usability of text entry on small devices by replacing the difficultly targeted shrunken keyboard keys with the more easily reproduced shrunken gestures that do not require targeting.

While this invention has been particularly shown and described with reference to a preferred embodiment, it will be understood by those skilled in the art that various changes in form and detail may be made therein without departing from the spirit and scope of the invention.

Although numerous characteristics and advantages of the present invention have been presented in the foregoing description, together with details of the structure and features of the invention, the disclosure is illustrative only. Those skilled in the art will appreciate the fact that the present invention is susceptible to modification including but not restricted to aspects such as shape, size and arrangement of parts without departing from the scope of fair meaning as defined in the claims which now follow.

I claim:

1. A method for character and command input to an electronic device using a set of combinatorial gesture patterns from two independent single point input track points or cursors, wherein said gesture patterns are associated with a conversion table, and wherein movement of the cursor or track point when performing said gestures is detected taking as reference a combination of the following elements:
   a) a neutral home position, each pattern being continuous, each pattern starting and ending at the neutral home position;
   b) direction of the movement; and
   c) orientation of the movement;
wherein limits of said neutral home position are defined by a continuous, closed boundary line.

2. The method according to claim 1, wherein said gesture patterns are round trip so that each of said two single point input device cursors or track points is returned to said neutral home position at the end of each gesture and said return establishes the end of each round trip gesture.

3. The method according to claim 1, wherein the crossing of said boundary line by said single point input device cursor or track point when moving from the inside to the outside of the boundary line identifies an outbound orientation of that portion of the device's cursor or track point movement.

4. The method according to claim 1, wherein the crossing of said boundary line by said single point input device cursor or track point when moving from the outside to the inside of the boundary line identifies an inbound orientation of that portion of the device's cursor or track point movement.

5. The method according to claim 1 wherein, for each of the two single point input device cursor or track points, the inbound crossing movement is paired with the previous outbound crossing movement to identify the completion of one full, round trip gesture which is then looked up in said conversion table.

6. The method according to claim 5, wherein the input to said conversion table is the unique digital signal corresponding to a given round trip gesture performed by one of said two single point input device cursor or track points, and the output is a digital signal which, once combined with the signal from the other of said two single point input device cursor or track points, yields a unique data string containing a combination of text, symbols, commands and mode changes which is relayed to said receiving electronic device.

7. The method according to claim 1, wherein the distance between the outbound crossing point and the inbound crossing point of the boundary line, on each round trip gesture, is used to identify whether the inbound movement proximally retraces the outbound movement, deviates to the right in a clockwise movement or deviates to the left in a counter-clockwise movement before returning home to complete a round trip gesture.

8. The method according to claim 1, wherein each single point input device's cursor or track point departure track from a neutral home position is detected and approximated to eight cardinal and inter-cardinal directions in a bi-dimensional space, followed by a return track to said neutral home position which is detected and approximated to one of three paths either proximally retracing the departure track in a reciprocal course, deviating to the right in a clockwise movement, or deviating to the left in a counter-clockwise movement before returning to said neutral home position to complete a round trip gesture.

9. The method according to claim 1, wherein the combination of range, direction and orientation of the round trip gesture of both single point input device cursor or track points, independent from each other, is simultaneously used to interpret the meaning of the user input and establish a direct correspondence with a set of data strings by means of said conversion table.

10. The method according to claim 8 wherein the departure track is independently combined with the return track to generate the gesture pattern of each single point input device cursor or track point.

11. The method according to claim 1 wherein the detection of an interruption of the gesture, with the single point input device cursor or track point dwelling outside of the neutral home position for a certain amount of time, can be interpreted as user uncertainty and used to trigger the activation of a help mechanism.

12. The method according to claim 11 wherein information pertaining to said help mechanism is presented on the same graphic interface display that the user normally monitors during regular operation of the electronic device.

13. The method according to claim 11 wherein said help mechanism selection is different according to the range, direction and orientation of the preceding outbound crossing movement of the single point input device cursor or track point.

14. The method according to claim 11 wherein the full set of combinatorial gesture patterns can be browsed by circling the neutral home position with the single point input device cursor or track point.

15. A method according to claim 1 for entering text, selecting a symbol, initiating an action or changing a mode using said gestures and two single point inputs.

16. The method according to claim 1, wherein the list of physical tools that can be used for controlling any of the two single point input track points or cursors includes a mouse, a touch pad, a track pad, a palm pad, a touch screen and a touch sensitive housing.

17. The method according to claim 1, wherein the detection of departure of a single point input device cursor or track point with a dwell outside of the neutral home position triggers the display of a command and character pallet.

18. The method according to claim 17, wherein circling the neutral home position with the single point input device cursor or track point allows the browsing through the command and character pallet and display of all the available commands and characters.

19. The method according to claim 1, wherein said continuous, closed boundary line is adjusted according to the gesture speed.

20. A method for data input to an electronic device having an operating system, comprising:
   a) Inputting data with a set of combinatorial gesture patterns from two single point input device cursor or track points;
   b) Comparing said data to one or more values in a database, said database comprising one or more fixed gesture patterns associated with one or more users;
   c) Associating said data with said one or more fixed gesture patterns;
   d) Identifying a profile based on said association step; and
   e) Allowing access under said profile to said operating system;
wherein movement of the two cursor or track points when performing said gesture patterns is detected taking as reference a combination of the following elements:
   i) a neutral home position, each pattern being continuous, each pattern starting and ending at the neutral home position;
   ii) the direction of the movement; and
   iii) the orientation of the movement;
and wherein the limits of said neutral home position are defined by a continuous, closed boundary line.

21. The method according to claim 20 wherein said access step comprises logging in, password input and other security features.

22. A method for correcting data input by a user to an electronic device, comprising:
   a) Inputting data with a set of combinatorial gesture patterns from two single point input device cursors or track points, each pattern being continuous, each pattern starting and ending at a home position;
   b) Comparing said data to one or more values in a database, said database comprising one or more fixed gesture patterns associated with said user;
   c) Associating said data with said one or more likely fixed gesture patterns; and
   d) Notifying said user about said likely fixed gesture patterns.

23. A method for data input to an electronic device having an operating system, comprising:
 a) Inputting data with a set of combinatorial gesture patterns from two single point input device cursor or track points, wherein said gesture patterns are associated with a conversion table to generate a corresponding gesture command for inputting said data, each pattern being continuous, each pattern starting and ending at a home position;
 b) Comparing said data to one or more values in a database, said database comprising one or more fixed gesture patterns associated with one or more users;
 c) Associating said data with said one or more fixed gesture patterns;
 d) Identifying a profile based on said association step; and
 e) Allowing access under said profile to said operating system.

* * * * *